US008851259B2

(12) United States Patent
Hamasaki et al.

(10) Patent No.: US 8,851,259 B2
(45) Date of Patent: Oct. 7, 2014

(54) ELECTROMAGNETIC CLUTCH, COMPRESSOR, AND MANUFACTURING METHOD FOR ELECTROMAGNETIC CLUTCH

(75) Inventors: Masafumi Hamasaki, Tokyo (JP); Masanori Takahashi, Tokyo (JP); Shinichi Isobe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 391 days.

(21) Appl. No.: 13/379,129

(22) PCT Filed: Jun. 17, 2010

(86) PCT No.: PCT/JP2010/004049
§ 371 (c)(1),
(2), (4) Date: Mar. 9, 2012

(87) PCT Pub. No.: WO2010/146864
PCT Pub. Date: Dec. 23, 2010

(65) Prior Publication Data
US 2012/0156062 A1  Jun. 21, 2012

(30) Foreign Application Priority Data

Jun. 18, 2009  (JP) ................................ 2009-145252
Jun. 18, 2009  (JP) ................................ 2009-145253

(51) Int. Cl.
F16D 27/112  (2006.01)
F04C 29/00   (2006.01)
F16D 27/06   (2006.01)
F04C 18/02   (2006.01)
F16D 27/00   (2006.01)

(52) U.S. Cl.
CPC ............ *F16D 27/112* (2013.01); *F04C 29/005* (2013.01); *F04C 18/0215* (2013.01); *F16D 27/06* (2013.01); *F16D 2300/10* (2013.01); *F16D 2027/008* (2013.01)
USPC ................................ 192/84.961; 192/107 M

(58) Field of Classification Search
CPC ......... F16D 27/06; F16D 27/14; F16D 27/00; F16D 2250/0038
USPC ................................ 192/84.961, 84.96, 84.94
See application file for complete search history.

(56) References Cited

U.S. PATENT DOCUMENTS 3,550,739 A   12/1970  Wiltsey et al.
4,705,973 A   11/1987  Koitabashi
(Continued)

FOREIGN PATENT DOCUMENTS

EP   0 216 514 A1   4/1987
JP   62-132039 A    6/1987
(Continued)

OTHER PUBLICATIONS

Notification of Transmittal of Translation of the Internatiional Preliminary Report on Patentability (Form PCT/IB/338) of International Application No. PCT/JP2010/004049 mailed Jan. 26, 2012 with Forms PCT/IB/373 and PCT/ISA/237.

(Continued)

*Primary Examiner* — Troy Chambers
*Assistant Examiner* — Lillian Nguyen
(74) *Attorney, Agent, or Firm* — Westerman, Hattori, Daniels & Adrian, LLP

(57) ABSTRACT

When grooves 44, 45A and 45B of an armature 42 and a rotor 43 are formed by laser beam machining, a metal oxide layer 100 is formed on wall surfaces defining the grooves 44, 45A and 45B. The metal oxide layer 100 is brought into sliding contact with a first contact surface A1 to a fourth contact surface A4 in a process in which an electromagnetic clutch is used, so that a part of the metal oxide layer 100 is ground and peeled off, whereby particles made of a metal oxide are produced. The particles enter the contact surface between the armature 42 and the rotor 43, which increases the frictional force therebetween to thereby prevent slippage. As a result, the torque transmission capability of the electromagnetic clutch M is enhanced, and the increase in the torque of a scroll compressor is achieved.

10 Claims, 11 Drawing Sheets

(56) References Cited

U.S. PATENT DOCUMENTS

| | | | |
|---|---|---|---|
| 4,727,974 A * | 3/1988 | Takatoshi | 192/84.961 |
| 4,749,073 A | 6/1988 | Olsen | |
| 4,951,797 A | 8/1990 | Booth et al. | |
| 5,642,798 A * | 7/1997 | Muirhead et al. | 192/84.961 |
| 6,364,084 B1 * | 4/2002 | Boyer et al. | 192/84.961 |
| 2003/0194497 A1 * | 10/2003 | Takada et al. | 427/355 |
| 2004/0016617 A1 * | 1/2004 | Imai et al. | 192/84.961 |

FOREIGN PATENT DOCUMENTS

| | | | |
|---|---|---|---|
| JP | 63252687 A * | 10/1988 | |
| JP | 2000-291705 A | 10/2000 | |
| JP | 2003-314584 A | 11/2003 | |
| JP | 2008-280562 A | 11/2008 | |
| JP | 2009-108927 A | 5/2009 | |
| WO | 01/65133 A1 | 9/2001 | |

OTHER PUBLICATIONS

International Search Report of PCT/JP2010/004049, mailing date Sep. 7, 2010.

Extended European Search Report dated Nov. 8, 2012, issued in corresponding European patent application No. 10789243.2.

* cited by examiner

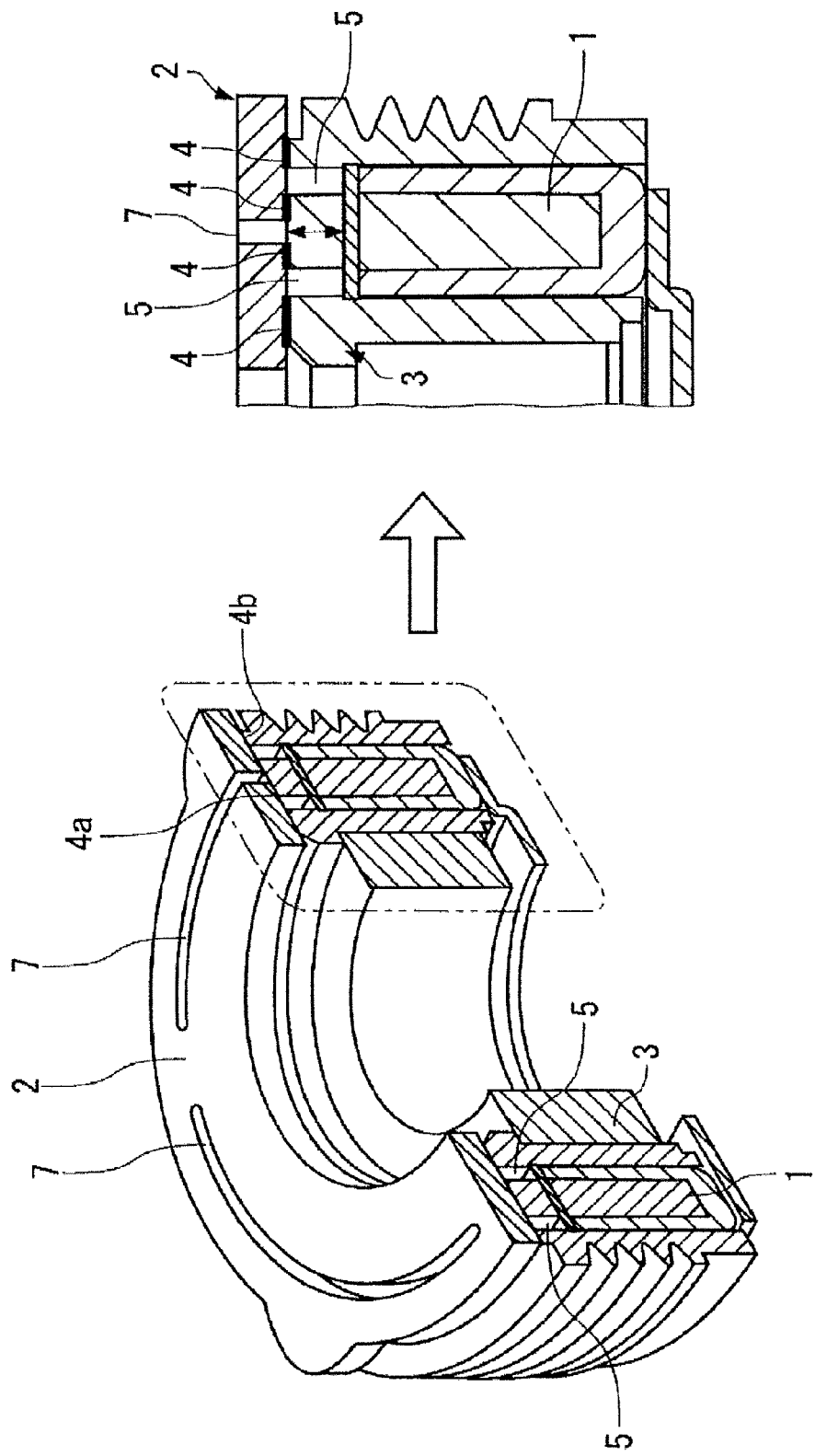
FIG. 5 --PRIOR ART--

FIG. 6A   --PRIOR ART--
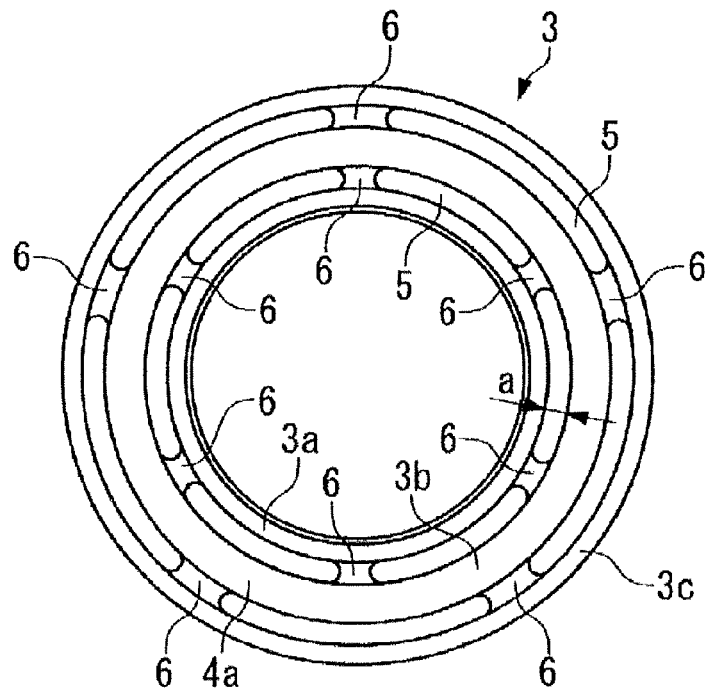
FIG. 6B   --PRIOR ART--
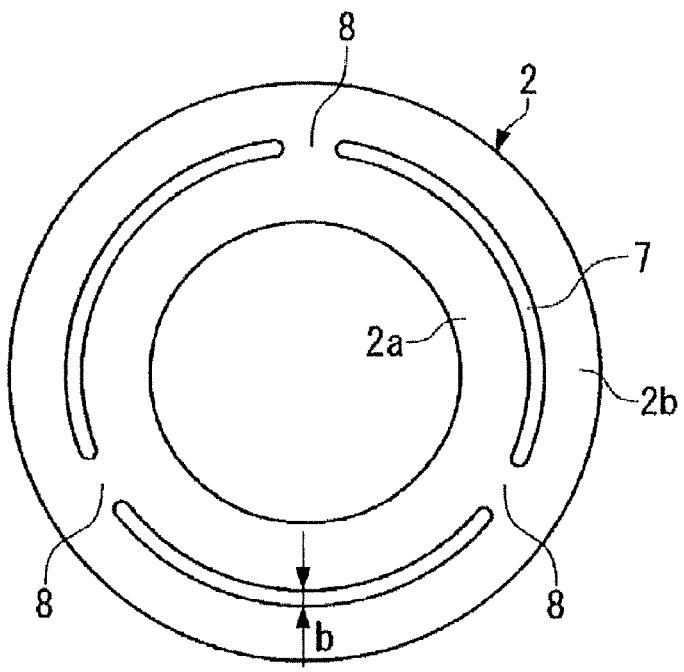

ELECTROMAGNETIC CLUTCH, COMPRESSOR, AND MANUFACTURING METHOD FOR ELECTROMAGNETIC CLUTCH

FIELD OF THE INVENTION

The present invention relates to an electromagnetic clutch used for a vehicle air conditioning apparatus and the like to transmit power, a compressor provided with the electromagnetic clutch, and a manufacturing method for the electromagnetic clutch.

BACKGROUND OF THE INVENTION

Conventionally, a compressor used for a vehicle air conditioning apparatus comprises an electromagnetic clutch that is disposed between the compressor and a driving source to transmit power.

The electromagnetic clutch selectively transmits power by an electromagnetic force or does not transmit power. For example, as shown in FIG. 5, the electromagnetic clutch is configured so that power is transmitted by attracting an armature 2 to a rotor 3 by means of the magnetic force of an electromagnetic coil 1 and combining the armature 2 and the rotor 3 together (for example, refer to Patent Document 1). In the configuration example shown in FIG. 5, the radial width of the armature 2 is divided into two parts, and the radial width of the rotor 3 is divided into three parts, whereby a contact surface (gap) 4 between the armature 2 and the rotor 3 is divided into four parts in the radial direction. In the explanation below, the contact surface 4 on the rotor 3 side is called an armature contact surface 4a, and the contact surface 4 on the armature 2 side is called a rotor contact surface 4b.

Also, for example, as shown in FIG. 6A, the armature contact surface 4a of the rotor 3 is divided into three parts in the radial direction by two grooves 5 having a groove width a, whereby an inner peripheral ring 3a, a central ring 3b, and an outer peripheral ring 3c are formed. Each of the two grooves 5 is divided into a plurality of sections in the circumferential direction by bridges 6 connecting the inner peripheral ring 3a, the central ring 3b, and the outer peripheral ring 3c together.

As shown in FIG. 6B, the armature 2 is also divided into two parts, an inner peripheral part 2a and an outer peripheral part 2b, in the radial direction by a groove 7 having a groove width b. The groove 7 on the armature 2 side is also divided into a plurality of sections in the circumferential direction by bridges 8 connecting the inner peripheral part 2a and the outer peripheral part 2b together. The armature 2 in this case is formed by a plate produced by punching a plate-shaped raw material.

CITATION LIST

Patent Document

Patent Document 1: Japanese Patent Laid-Open No. 2003-314584

BRIEF SUMMARY OF THE INVENTION

For the above-described conventional electromagnetic clutch, in the case where a sufficient attraction force between the armature 2 and the rotor 3 cannot be secured by a short-circuiting magnetic flux and the like flowing in the bridges 6 and 8, the torque transmission capability decreases. That is, in the case where the torque transmission capability decreases as the result of a shortage of attraction force, there arises a problem that a trouble of slippage occurs between the armature 2 and the rotor 3.

Accordingly, it is conceivable that the frictional force is increased by the increase in the contact area between the armature 2 and the rotor 3. For this purpose, the increase in the outside diameters of the armature 2 and the rotor 3 can also be thought of. However, this idea is unfavorable because the size of the electromagnetic clutch is increased by the increase in outside diameters.

The present invention has been made to solve the above-described technical problems, and accordingly an object thereof is to provide an electromagnetic clutch capable of increasing the frictional force between an armature and a rotor without the increase in the outside dimensions of the electromagnetic clutch, a compressor using this clutch, and a manufacturing method for this electromagnetic clutch.

The present invention, which has been accomplished to achieve the above object, provides an electromagnetic clutch for transmitting power by attracting an armature to the contact surface of a rotor by means of the magnetic force of an electromagnetic coil and by combining the armature and the rotor together, wherein the armature contact surface of the rotor is divided in the radial direction by a rotor-side groove; the rotor contact surface of the armature is divided in the radial direction by an armature-side groove; and a metal oxide layer is formed on at least one surface of a wall surface defining the rotor-side groove and a wall surface defining the armature-side groove. In the description below, the metal oxide layer formed on the wall surface defining the rotor-side groove is sometimes called a rotor-side oxide layer, and the metal oxide layer formed on the wall surface defining the armature-side groove is sometimes called an armature-side oxide layer.

By the use of the electromagnetic clutch configured as described above, the armature contact surface of the rotor and the rotor contact surface of the armature are brought into sliding contact with each other and are worn. On account of this, the armature-side oxide layer comes into sliding contact with the armature contact surface of the rotor, and the rotor-side oxide layer comes into sliding contact with the rotor contact surface of the armature. Therefore, a part of the metal oxide layers is ground or peeled off (hereinafter, referred collectively to as "around"), metal oxide particles are produced, and these particles are supplied to the armature contact surface of the rotor and the rotor contact surface of the armature. Thereby, slippage can be restrained by increasing the frictional force between the armature and the rotor without the increase in outside dimensions.

The metal oxide layer preferably has a thickness of 0.1 µm to 10 µm. Also, the Vickers hardness of each of the rotor and the armature is preferably in the range of 100HV10 to 350HV10, and the Vickers hardness of the metal oxide layer is preferably in the range of 700HV0.003 to 1200HV0.003. Since the Vickers hardness of the metal oxide layer is high as described above, the particles produced from the metal oxide layer enter a portion between the armature and the rotor that are brought into contact with each other by the attraction force to increase the frictional force between the armature and the rotor, whereby the slippage can be restrained.

The width of the groove formed on the rotor contact surface of the armature is preferably 0.8 to 1.2 mm. Thereby, the contact area between the rotor and the armature can be increased without the increase in the size of the electromagnetic clutch, so that the attraction force is increased. As a result, the frictional force between the armature and the rotor is increased, and thereby the slippage can be restrained.

Also, the compressor in accordance with the present invention can comprise the above-described electromagnetic clutch that is mounted in a shaft portion of a compression mechanism to transmit power.

Further, the present invention provides a manufacturing method for an electromagnetic clutch which transmits power by attracting an armature to the contact surface of a rotor by means of the magnetic force of an electromagnetic coil and by combining the armature and the rotor together, and the electromagnetic clutch is configured so that the armature contact surface of the rotor is divided in the radial direction by a rotor-side groove, and the rotor contact surface of the armature is divided in the radial direction by an armature-side groove, wherein a metal oxide layer is formed on at least one surface of a wall surface defining the rotor-side groove and a wall surface defining the armature-side groove by laser beam machining. In this manufacturing method for the electromagnetic clutch, it is preferable that the metal oxide layer be formed by laser beam machining when at least one of the rotor-side groove and the armature-side groove is formed. Also, during the laser beam machining, oxygen is preferably blown against the position at which a laser beam is applied, that is, the rotor-side groove or the armature-side groove.

According to the above-described manufacturing method for the electromagnetic clutch, since a laser beam is used, fine grooves (rotor-side groove, armature-side groove) can be formed in the armature and the rotor, and also the metal oxide layer can be formed easily simultaneously with the groove formation effected by heat generated by the application of laser beam. Also, if oxygen is blown against the position at which a laser beam is applied, the melting of a cut portion is accelerated by the oxidation reaction heat, so that the machining speed of the groove can be increased.

According to the present invention, on account of the use of the electromagnetic clutch, the armature-side oxide layer in sliding contact with the armature contact surface of the rotor and the rotor-side oxide layer in sliding contact with the rotor contact surface of the armature turn to particles, and the particles are supplied to the armature contact surface of the rotor and the rotor contact surface of the armature. Thereby, the frictional force between the armature and the rotor is increased, so that the slippage can be restrained.

BRIEF DESCRIPTION OF DRAWINGS

FIG. 5 is a cutaway perspective view of a conventional electromagnetic clutch, and an enlarged sectional view showing a contact portion between an armature and a rotor of the conventional electromagnetic clutch.

FIG. 6A is a plan view of a conventional rotor, and FIG. 6B is a plan view of a conventional armature.

DETAILED DESCRIPTION OF THE INVENTION

One embodiment of an electromagnetic clutch and a compressor provided with this electromagnetic clutch in accordance with the present invention will now be described with reference to the accompanying drawings.

Figure 1:
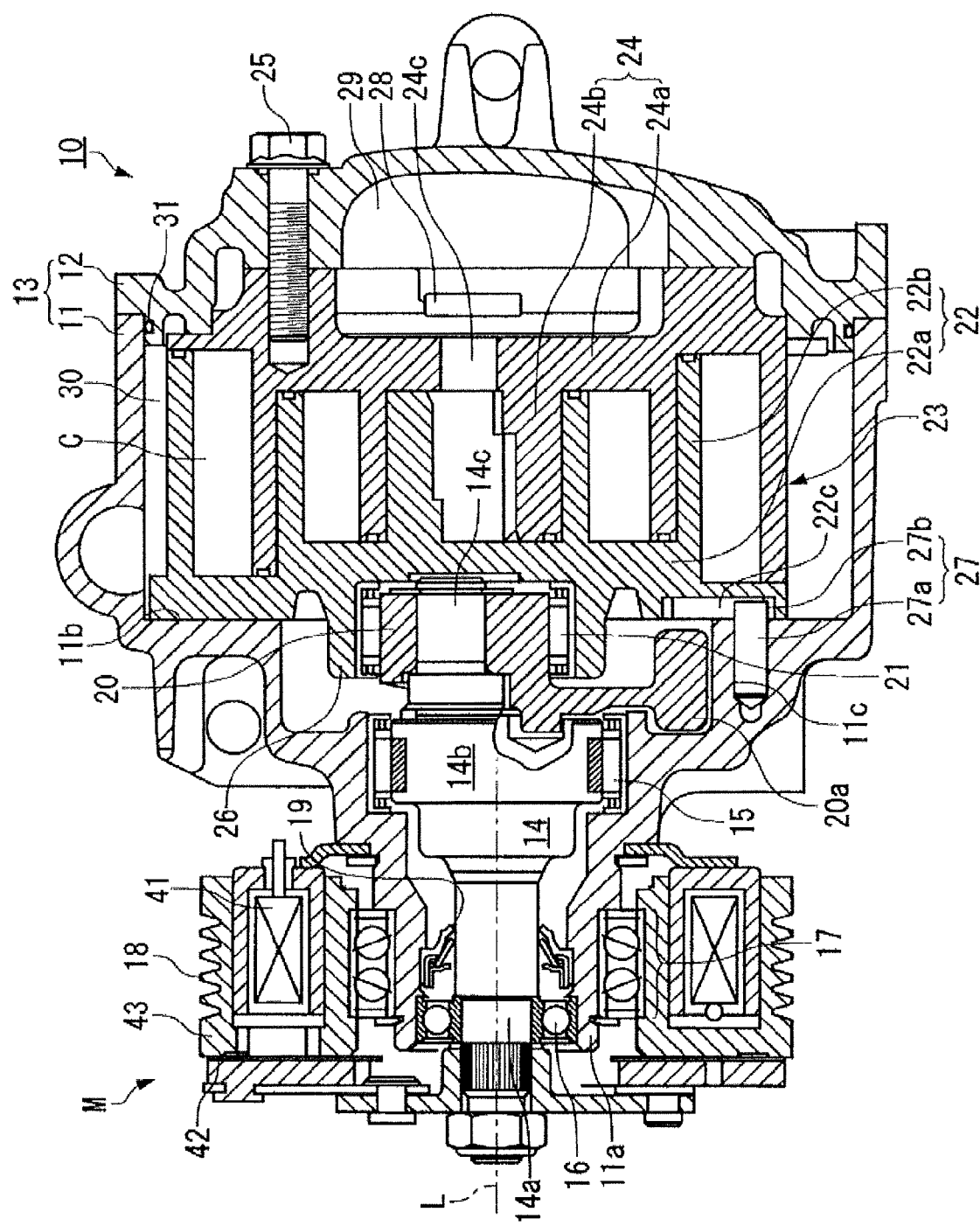
FIG. 1 is a longitudinal sectional view showing a configuration example of a scroll compressor provided with an electromagnetic clutch in accordance with an embodiment of the present invention.

FIG. 1 is a longitudinal sectional view showing a configuration example of a scroll compressor provided with the electromagnetic clutch. This scroll compressor (compressor) 10 includes a front housing 11 and a rear housing 12, and includes a housing 13 configured by fastenedly fixing the front housing 11 and the rear housing 12 to each other with bolts (not shown).

In the front housing 11, a crankshaft (rotating shaft) 14 is supported so as to be rotatable around the rotation axis line L thereof via a main bearing (needle bearing) 15 and a sub bearing (needle bearing) 16. One end side (the left-hand side in FIG. 1) of the crankshaft 14 is a small-diameter shaft part 14a, and this small-diameter shaft part 14a penetrates the front housing 11 and projects to one end side. The projecting portion of the small-diameter shaft part 14a is mounted with an electromagnetic clutch M, so that power is intermittently transmitted from a pulley 18, which is rotatably provided on the outer peripheral surface of a small-diameter boss part 11a on one end side of the front housing 11 via a bearing 17, to the compressor. To the pulley 18, power is transmitted from an external driving source (not shown) such as an engine via a V-belt or the like.

Between the main bearing 15 and the sub bearing 16, a mechanical seal (lip type seal) 19 is provided to airtightly seal the interior of the housing 13 against the atmosphere.

On the other hand, on the other end side (the right-hand side in FIG. 1), a large-diameter shaft part 14b is provided, and this large-diameter shaft part 14b is provided with an eccentric pin 14c integrally in a state of being off-center from the rotation axis line L of the crankshaft 14 by a predetermined dimension. The large-diameter shaft part 14b and the small-diameter shaft part 14a of the crankshaft 14 are rotatably supported on the front housing 11 via the main bearing 15 and the sub bearing 16, respectively.

Also, to the eccentric pin 14c, an orbiting scroll member 22 is connected via a balance bush 20 and a drive bearing 21, so that the orbiting scroll member 22 is orbitingly driven by the rotation of the crankshaft 14.

The balance bush 20 comprises a balance weight 20a for removing an unbalanced load applied when the orbiting scroll member 22 is orbitingly driven, and is orbited when the orbiting scroll member 22 is orbitingly driven.

In the housing 13, a pair of a fixed scroll member 24 and the orbiting scroll member 22 constituting a scroll compression mechanism 23 are assembled.

The fixed scroll member 24 includes a fixed end plate 24a and a spiral wrap 24b erected from the fixed end plate 24a. On the other hand, the orbiting scroll member 22 includes an orbiting end plate 22a and a spiral wrap 22b erected from the orbiting end plate 22a.

The fixed scroll member 24 and the orbiting scroll member 22 are assembled in the state in which the centers thereof are separated from each other by an orbiting radius, and the spiral wraps 24b and 22b are engaged with each other with the phase being 180° shifted. Thereby, between the scroll members 24 and 22, a pair of compression chambers C, which are partitioned by the end plates 24a and 22a and the spiral wraps 24b and 22b, are formed symmetrically with respect to the center of scroll.

The fixed scroll member 24 is fixed to the inner surface (bottom surface) of the rear housing 12 via bolts 25. The orbiting scroll member 22 is connected to the crankshaft 14 by fitting the eccentric pin 14c, which is provided on one end side of the crankshaft 14, in a boss part 26, which is provided on the back surface of the orbiting end plate 22a, via the balance bush 20 and the drive bearing 21.

Also, for the orbiting scroll member 22, the back surface of the orbiting end plate 22a is supported on a thrust receiving surface 11b formed on the front housing 11. The orbiting scroll member 22 is configured so as to be revolvingly and orbitingly driven with respect to the fixed scroll member 24 while the rotation thereof is inhibited by a rotation inhibiting pin-ring mechanism 27 interposed between the thrust receiving surface 11b and the back surface of the orbiting scroll member 22.

The rotation inhibiting pin-ring mechanism 27 includes a pin 27a and a ring 27b. A pin hole 11c for erecting the pin 27a is provided on one of the back surface of the orbiting end plate 22a of the orbiting scroll member 22 and the thrust receiving surface 11b, and a ring hole 22c engaged with the ring 27b is provided on the other thereof. In this embodiment, the pin hole 11c for erecting the pin 27a is provided on the thrust receiving surface 11b, and the ring hole 22c engaged with the ring 27b is provided in the orbiting scroll member 22.

The pin hole 11c and the ring hole 22c are provided at a plurality of places in the circumferential direction, generally at three to four places (four places in this embodiment).

Further, in the central portion of the fixed end plate 24a of the fixed scroll member 24, a discharge port 24c for discharging compressed refrigerant gas is provided. In the discharge port 24c, a discharge reed valve (not shown) attached to the fixed end plate 24a via a retainer 28 is provided.

Also, on the back surface of the fixed end plate 24a of the fixed scroll member 24, a seal member (not shown) such as an O-ring is provided so as to be in close contact with the inner surface of the rear housing 12, and between the back surface of the fixed end plate 24a of the fixed scroll member 24 and the rear housing 12, a discharge chamber 29 divided from the internal space (enclosed space) of the housing 13 is formed. Therefore, the internal space of the housing 13 excluding the discharge chamber 29 functions as a suction chamber 30.

Into the suction chamber 30, the refrigerant gas returning from a refrigerating cycle is sucked via a suction port (not shown) provided in the front housing 11, and through the suction chamber 30, the refrigerant gas is sucked into the compression chamber C formed between the fixed scroll member 24 and the orbiting scroll member 22.

On the joint surface between the front housing 11 and the rear housing 12, a seal member 31 such as an O-ring is provided to airtightly seal the suction chamber 30 in the housing 13 against the atmosphere.

The scroll compressor 10 configured as described above operates as described below.

A rotational driving force transmitted from the external driving source to the pulley 18 is transmitted to the crankshaft 14 via the electromagnetic clutch M to rotate the crankshaft 14. Then, the orbiting scroll member 22 connected to the eccentric pin 14c of the crankshaft 14 via the balance bush 20 and the drive bearing 21 is revolvingly and orbitingly driven with respect to the fixed scroll member 24 while the rotation thereof is inhibited by the rotation inhibiting pin-ring mechanism 27.

When the orbiting scroll member 22 is revolvingly and orbitingly driven, the refrigerant gas in the suction chamber 30 is sucked into the compression chamber C formed on the outmost side in the radial direction. After the suction has been cut off at a predetermined orbiting angle position, the compression chamber C moves to the center side while the volume thereof is decreased in the periphery direction and the wrap height direction. During this time, the refrigerant gas is compressed, and when the compression chamber C arrives at a position communicating with the discharge port 24c, the discharge reed valve is pushed to open, and the compressed gas is discharged into the discharge chamber 29. The compressed refrigerant gas is discharged to the outside of the compressor through a discharge port (not shown) provided in the rear housing 12.

The above-described scroll compressor 10 comprises the electromagnetic clutch M that is mounted on the crankshaft 14 of the compression mechanism to transmit power. This electromagnetic clutch M is used to transmit power by attracting an armature 42 made of a magnetic material to the contact surface of a rotor 43 by means of the magnetic force of an electromagnetic coil 41 and combining the armature 42 and the rotor 43 together.

Figure 2:
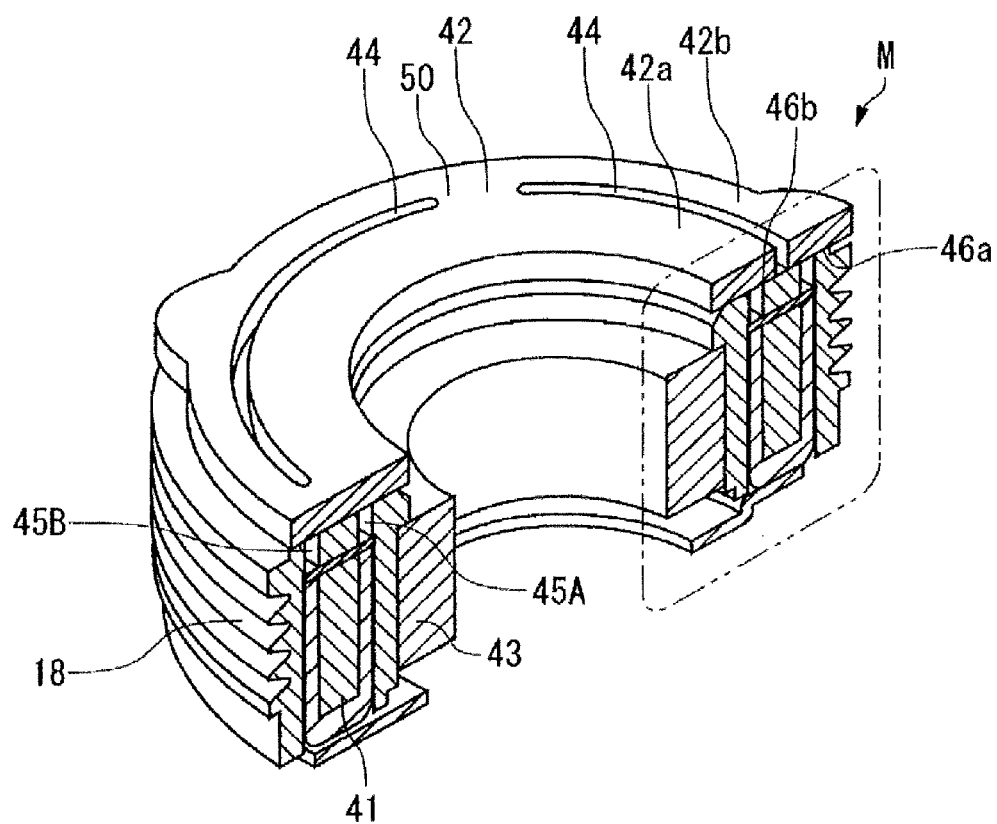
FIG. 2 is a cutaway perspective view of the electromagnetic clutch.
Figure 3A:
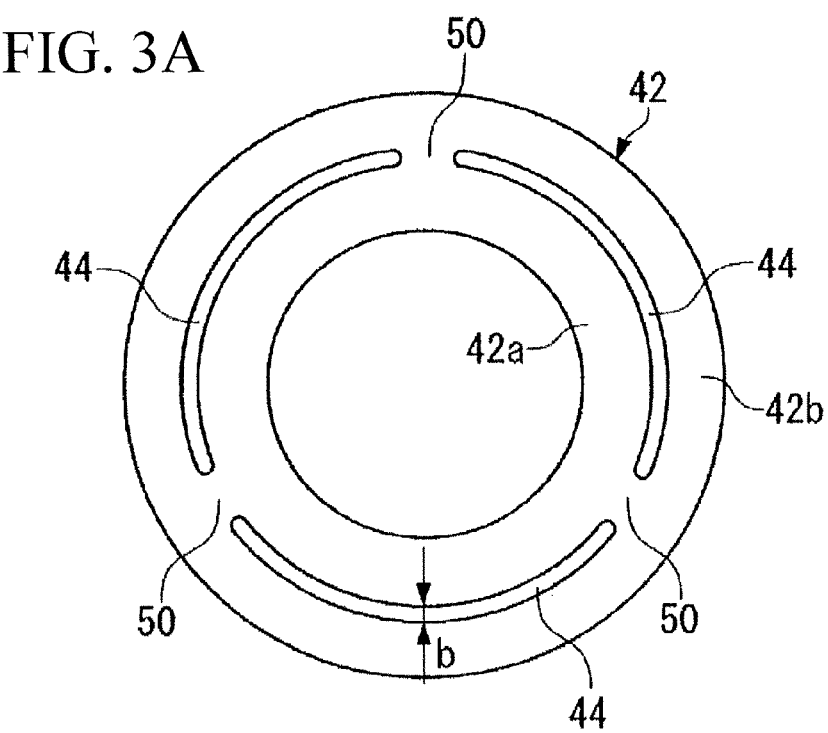
FIG. 3A is a plan view of an armature.

In the electromagnetic clutch M of this embodiment, for example, as shown in FIGS. 2 and 3A, the radial width of the armature 42 is divided into two parts by a groove (intermediate groove) 44 having a width b, and an inner peripheral ring 42a and an outer peripheral ring 42b are formed. The groove 44 is divided into a plurality of sections in the circumferential direction by bridges 50 connecting the inner peripheral ring 42a and the outer peripheral ring 42b together. Each of the grooves 44 divided by the bridges 50 forms an arc having the same width of b. Although being detailedly described later, in this embodiment, the grooves 44 and grooves 45A and 45B explained next are formed by laser beam machining.

Figure 3B:
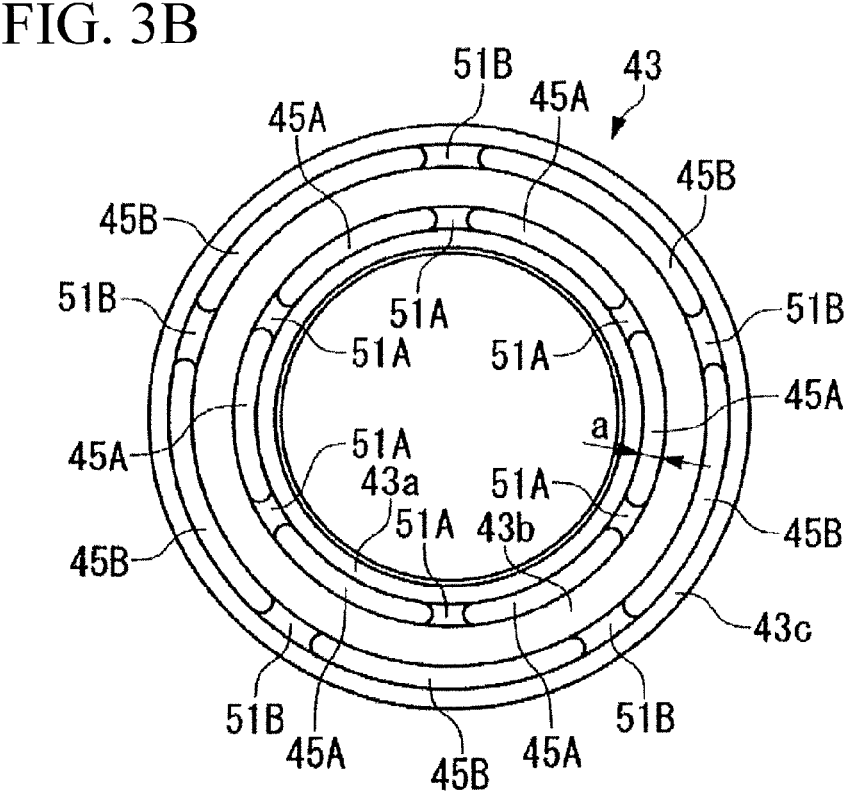
FIG. 3B is a plan view of a rotor.

Also, for the electromagnetic clutch M of this embodiment, for example, as shown in FIGS. 2 and 3B, the radial width of the rotor 43 is divided into three parts by two grooves, an inner peripheral groove 45A and an outer peripheral groove 45B each having a width a, and an inner peripheral ring 43a, a central ring 43b, and an outer peripheral ring 43c are formed. Each of the grooves 45A and 45B is divided into a plurality of sections in the circumferential direction by bridges 51A, 51B connecting the inner peripheral ring 43a, the central ring 43b, and the outer peripheral ring 43c together. Each of the grooves 45A, 45B divided by the bridges 51A, 51B forms an arc having the same width of a. The widths of the above-described grooves 44, 45A, and 45B each are preferably 0.8 to 1.2 mm. Even if the electromagnetic clutch itself is not made large in size, the contact area between the rotor and the armature can be increased, and also a short-circuiting magnetic flux can be restrained from being produced on both sides of the grooves 44, 45A, and 45B.

Figure 4:
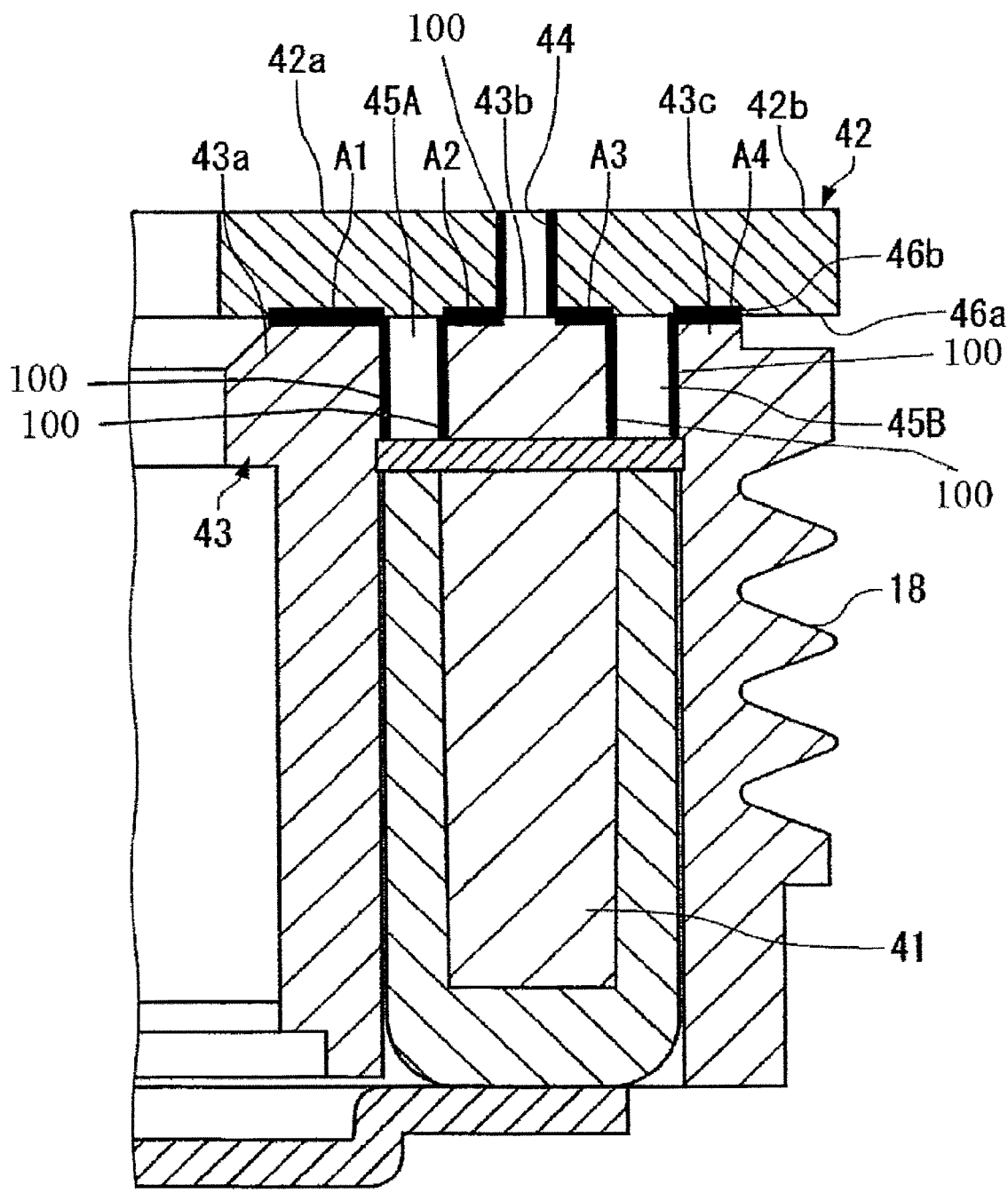
FIG. 4 is an enlarged sectional view showing a contact portion between an armature and a rotor.

As shown in FIG. 4, on account of the grooves 44, 45A, and 45B formed as described above, a rotor contact surface 46a of the armature 42 and an armature contact surface 46b of the rotor 43 generate an attraction force on an annular first contact surface A1 on which the inner peripheral ring 43a of the rotor 43 faces to the inner peripheral ring 42a of the armature 42, an annular second contact surface A2 on which the inner peripheral ring 42a of the armature 42 faces to the central ring 43b of the rotor 43, an annular third contact surface A3 on which the outer peripheral ring 42b of the armature 42 faces to the central ring 43b of the rotor 43, and an annular fourth contact surface A4 on which the outer peripheral ring 43c of the rotor 43 faces to the outer peripheral ring 42b of the armature 42.

In order to make the attraction force equal, the grooves 44, 45A, and 45B are preferably formed so that the annular areas of the first contact surface A1, the second contact surface A2, the third contact surface A3, and the fourth contact surface A4 are approximately equal to each other. Also, in order to increase a force against the rotational torque at the time when the armature 42 and the rotor 43 are attracted to each other, the area of the fourth contact surface A4 on the outermost periphery side may be made at a maximum among the first contact surface A1, the second contact surface A2, the third contact surface A3, and the fourth contact surface A4.

In this embodiment, on the wall surface defining each of the grooves 44, 45A, and 45B, a metal oxide layer 100 is formed.

The metal oxide layer 100 formed on the wall surface defining the groove 44 is formed ranging from the upper end edge to the lower end edge of the groove 44. The portion in which this metal oxide layer 100 is formed at the lower end edge is in contact with the second contact surface A2 and the third contact surface A3.

The metal oxide layer 100 formed on the wall surface defining the groove 45A is formed ranging from the upper end edge to the lower end edge of the groove 45A. The portion in which this metal oxide layer 100 is formed at the upper end edge is in contact with the first contact surface A1 and the second contact surface A2.

The metal oxide layer 100 formed on the wall surface defining the groove 45B is formed ranging from the upper end edge to the lower end edge of the groove 45B. The portion in which this metal oxide layer 100 is formed at the upper end edge is in contact with the third contact surface A3 and the fourth contact surface A4.

Figure 7:
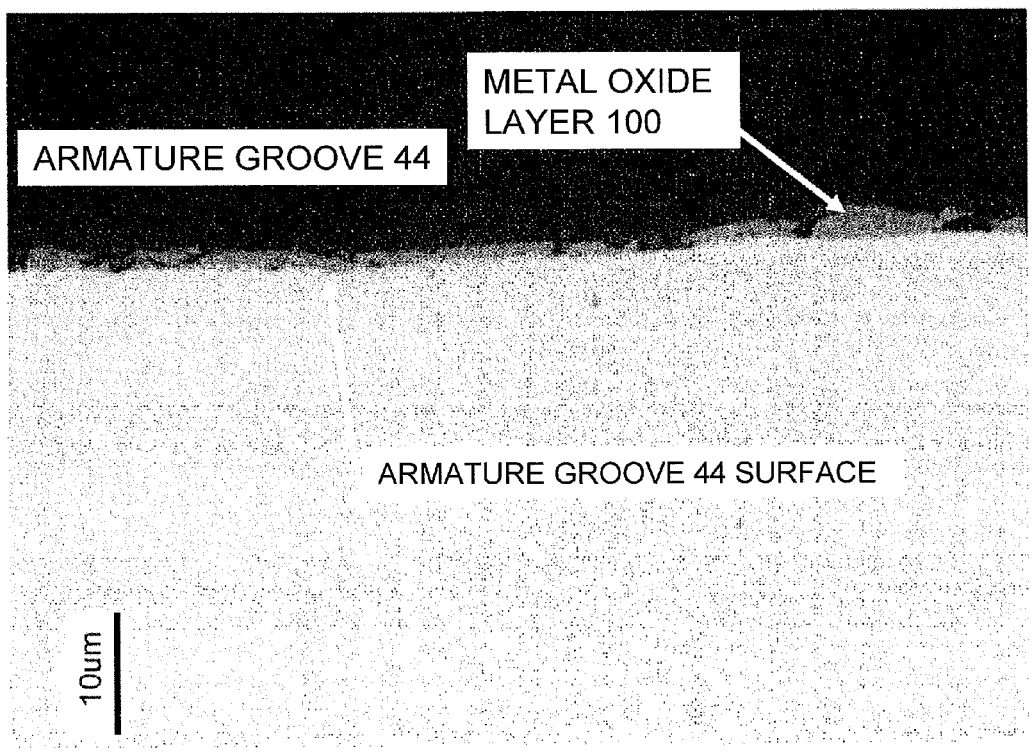
FIG. 7 is a microphotograph of a section of a groove portion of an armature.

The metal oxide layer 100 may be provided so as to have a thickness of 0.1 μm to 10 μm. However, as described later, the metal oxide layer 100 preferably has a thickness of 0.5 μm to 3 μm. FIG. 7 shows a microphotograph of a section of a portion near the groove 44 of the armature 42. To form the metal oxide layer 100 shown in FIG. 7, the groove 44 was formed in a mild (soft) steel material (SPHC, hot-rolled steel plate) having a thickness of 4.5 mm at a rate of 3.5 m/min by using a $CO_2$ laser having an output of 2500 W. As shown in FIG. 7, the metal oxide layer 100 having a thickness of about 0.5 μm to 3 μm sticks on the wall surface defining the groove 44 of the armature 42. The reason for this is that the metal oxide layer 100 is ground by the sliding contact between the armature 42 and the rotor 43, and the produced metal oxide particles are liable to have a size of about 0.1 μm to 1 μm. A portion in which the metal oxide layer 100 does not stick may exist on the surface of the groove 44. Most preferably, a metal oxide layer having a thickness of about 1 μm should be provided. However, if the metal oxide layer having a thickness of 0.1 μm to 10 μm sticks even partially, the object of the present invention can be achieved.

Figure 8:
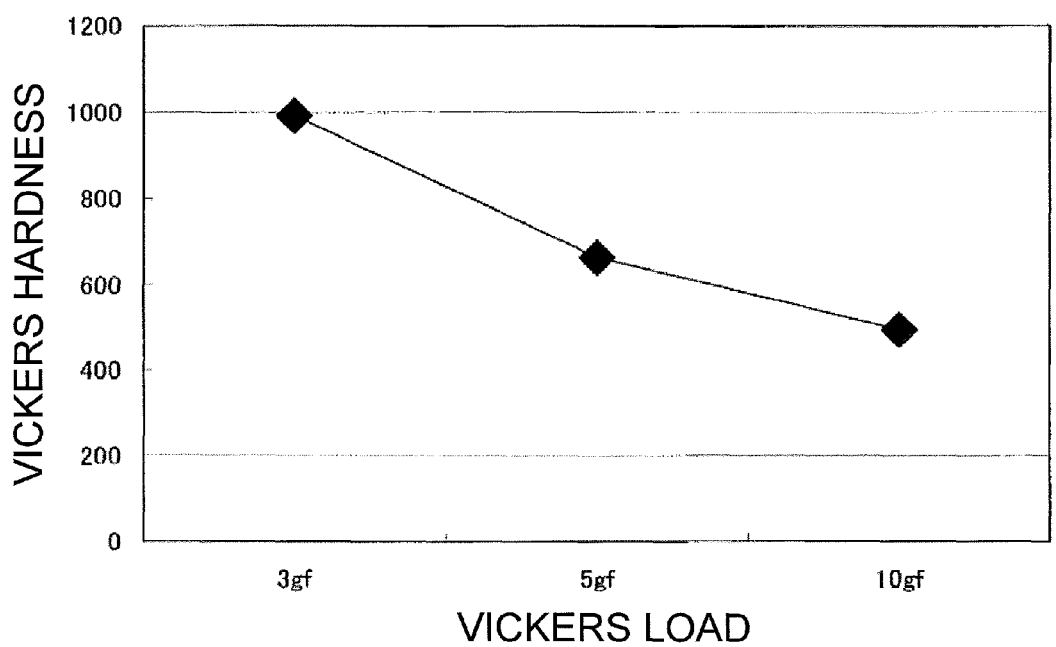
FIG. 8 is a graph showing the measurement results obtained by the micro-Vickers hardness test, for the surface of a metal oxide layer 100 shown in FIG. 7.

FIG. 8 shows the measurement results obtained by the micro-Vickers hardness test, for the surface of the metal oxide layer 100 shown in FIG. 7. In this embodiment, the Vickers hardnesses were about 1000 at 3 gf load (in this description, shown as 1000HV0.003, the same is true in the description below) and about 650HV0.005 and 500HV0.010. This is because if the load is high, the mild steel material on the surface of armature exerts an influence on the measurements. When the armature 42 has a Vickers hardness of 100HV to 350HV, the laser beam may be applied so that the Vickers hardness of the metal oxide layer 100 is in the range of 700HV0.003 to 1200HV0.003. However, the most preferable Vickers hardness of the metal oxide layer 100 is about 1000±100HV0.003.

The above is a description concerning the groove 44 of the armature 42. In the grooves 45A and 45B of the rotor 43 as well, the metal oxide layer 100 is preferably formed in the same way.

The main component of the metal oxide layer 100 is not hydrous iron oxide $Fe_2O_3H_2O$, which is commonly called red rust, but triiron tetraoxide ($Fe_3O_4$) produced by high-temperature oxidation, which is commonly called "black scale".

For the above-described electromagnetic clutch, by the use thereof, the rotor contact surface 46a and the armature contact surface 46b are brought into sliding contact with each other and are worn on the first contact surface A1, the second contact surface A2, the third contact surface A3, and the fourth contact surface A4.

In this process, the metal oxide layer 100 at the lower end edge of the groove 44, which is formed on the wall surface defining the groove 44, comes into sliding contact with the second contact surface A2 and the third contact surface A3, and is ground into fine particles.

The same is true for the grooves 45A and 45B. Particles are produced from the metal oxide layer 100 by the sliding contact between the first contact surface A1 and the second contact surface A2 for the groove 45A, and by the sliding contact between the third contact surface A3 and the fourth contact surface A4 for the groove 45B.

The fine particles produced from the metal oxide layer 100 have, for example, a particle size of about 0.1 μm to 1 μm, and enter the first contact surface A1, the second contact surface A2, the third contact surface A3, and the fourth contact surface A4. Since the metal oxide layer 100 is formed ranging from the upper end edge to the lower end edge of each of the grooves 44, 45A, and 45B, the particles can continue to be supplied to the contact surfaces as far as the electromagnetic clutch M is used.

When the particle sizes of the produced particles are relatively large, for example, even if the particle size is about 5 μm, the particles are ground down by the first contact surface A1, the second contact surface A2, the third contact surface A3, and the fourth contact surface A4 so that the particle size becomes about 0.1 μm to 1 μm, and enter the first contact surface A1, the second contact surface A2, the third contact surface A3, and the fourth contact surface A4. The particles produced from the metal oxide layer 100, which have entered the contact surfaces A1 to A4 (hereinafter, referred to as metal oxide particles) act as a resistance on the contact surface, and increase the frictional force between the rotor 43 and the armature 42. Therefore, the metal oxide particles can restrain the slippage between the rotor 43 and the armature 42. Further, the metal oxide particles are supplied successively as the rotor 43 and the armature 42 are worn, so that the metal oxide particles can be supplied steadily to between the rotor 43 and the armature 42. Even if the metal oxide layer 100 is formed only on any of the grooves 44, 45A and 45B, the above-described effect can be achieved.

The grooves 44, 45A and 45B are formed by laser beam machining. In laser beam machining, a laser beam and the armature 42 and rotor 43 are moved relatively while the laser beam is applied to plate-shaped materials forming the armature 42 and the rotor 43, whereby the plate-shaped materials are cut (meltingly cut) to form the grooves 44, 45A and 45B.

The metal oxide layer 100 can be formed by the application of laser beam only. Further preferably, however, oxygen is blown against the position at which the laser beam is applied. Thereby, the metal oxide layer 100 can be formed efficiently. The blow of oxygen also gives an effect of increasing the cutting speed.

In this embodiment, the area of one or both of the second contact surface A2 and the third contact surface A3, which are located on both sides of the groove 44 of the armature 42, is liable to be the smallest among the first contact surface A1, the second contact surface A2, the third contact surface A3, and the fourth contact surface A4. Therefore, it is preferable that the areas of the second contact surface A2 and the third contact surface A3 each account for 11% or more of the total area A0 between the inside diameter side of the first contact surface A1 and the outside diameter side of the fourth contact surface A4. Further preferably, the area of the second contact surface A2 is not less than 11% and not more than 14% of the total area A0, and the area of the third contact surface A3 is not less than 12% and not more than 15% of the total area A0.

Thus, the area of the second contact surface A2 or the third contact surface A3, which has the smallest area, among the first contact surface A1, the second contact surface A2, the third contact surface A3, and the fourth contact surface A4 is kept at a predetermined value or larger, whereby the contact area of the second contact surface A2 or the third contact surface A3 can be kept to the largest possible.

The groove 44 which is located between the second contact surface A2 and the third contact surface A3 and has the smallest area among the grooves 44, 45A and 45B formed as described above preferably has a width b of 0.5 to 1.5 mm, further preferably 0.8 to 1.2 mm. If the width of the groove 44 exceeds the above-described range, an effect of increasing the contact area between the armature 42 and the rotor 43 on account of the narrow width of the groove 44 is deteriorated. If the width of the groove 44 is narrower than the above-described range, a short-circuiting magnetic flux is produced between the inside diameter side and the outside diameter side of the groove 44, so that the attraction force between the armature 42 and the rotor 43 is decreased.

The same is true for the grooves 45A and 45B. In this embodiment, the width b of the groove 44 is set so as to be smaller than the width a of each of the grooves 45A and 45B. It is a matter of course that the width b of the groove 44 can be made equal to the width a of each of the grooves 45A and 45B. Also, the width b of the groove 44 can be set so as to be smaller than the sum of the width a of the groove 45A and the width a of the groove 45B.

Thus, by forming the grooves 44, 45A and 45B by laser beam machining, the widths a and b of the grooves 44, 45A and 45B can be set as small as possible as far as no short-circuiting magnetic flux is produced. Thereby, the pressure bonding area between the armature 42 and the rotor 43 can be increased without the increase in sizes of the armature 42 and the rotor 43, and therefore the attraction force between the armature 42 and the rotor 43 can be increased. As a result, the torque transmission capability of the electromagnetic clutch M can be enhanced, and the increase in the torque of the scroll compressor 10 can be achieved.

Also, by forming the grooves 44, 45A and 45B by laser beam machining, the inner peripheral surfaces of the grooves 44, 45A and 45B are hardened by the heat input applied by the laser beam, and the hardness of each of the grooves 44, 45A and 45B is higher than that of the base material for the armature 42 and the rotor 43. As a result, the strengths of the wall surfaces defining the grooves 44, 45A and 45B can be enhanced.

For the above-described armature 42 and rotor 43, a mild steel such as SPHC (hot-rolled steel plate) or SPCC (cold-rolled steel plate), or a low-carbon steel such as S12C may be preferably used. The reason for this is that if the carbon content of steel material is increased, the hardness becomes high, but the ferrite phase decreases, and therefore the magnetic flux density (magnetic permeability) decreases.

EXAMPLE 1

The present inventors investigated the difference in the attraction force between the armature 42 and the rotor 43 at the time when the widths of the grooves 44, 45A and 45B were changed in the electromagnetic clutch M provided the above-described armature 42 and rotor 43. The investigation results are shown below.

First, the armature 42 and the rotor 43 were formed from a steel material such as carbon steel, and each of them were formed into a ring shape having an outside diameter of 110 mm and an inside diameter of 65 mm.

The width b of the groove 44 in the armature 42 was changed to 0.5, 0.8, 1.0, 1.2, 1.5 and 2.2 (present state), and the ratio of attraction force between the armature 42 and the rotor 43 at the time when a magnetic field was generated by the electromagnetic coil 41 under the same conditions was determined by simulation using an electronic computer.

TABLE 1

| | | | | | | | (mm · mm$^2$) |
|---|---|---|---|---|---|---|---|
| | | Width b | | | | | |
| Armature groove | | 0.5 | 0.8 | 1.0 | 1.2 | 1.5 | 2.2 |
| A1 | Inside diameter | 70.0 | 70.0 | 70.0 | 70.0 | 70.0 | 70.0 |
| | Outside diameter | 76.3 | 76.3 | 76.3 | 76.3 | 76.3 | 76.3 |
| | Area | 723.9 | 723.9 | 723.9 | 723.9 | 723.9 | 723.9 |
| | Area ratio A1/A0 | 18.1% | 18.1% | 18.1% | 18.1% | 18.1% | 18.1% |
| A2 | Inside diameter | 81.1 | 81.1 | 81.1 | 81.1 | 81.1 | 81.1 |
| | Outside diameter | 85.5 | 85.2 | 85.0 | 84.8 | 84.5 | 83.8 |
| | Area | 575.7 | 535.5 | 508.8 | 482.1 | 442.2 | 349.7 |
| | Area ratio A2/A0 | 14.4% | 13.4% | 12.7% | 12.0% | 11.0% | 8.7% |
| A3 | Inside diameter | 86.5 | 86.8 | 87.0 | 87.2 | 87.5 | 88.2 |
| | Outside diameter | 91.0 | 91.0 | 91.0 | 91.0 | 91.0 | 91.0 |
| | Area | 627.3 | 586.5 | 559.2 | 531.8 | 490.7 | 394.1 |
| | Area ratio A3/A0 | 15.7% | 14.6% | 14.0% | 13.3% | 12.3% | 9.8% |
| A4 | Inside diameter | 95.5 | 95.5 | 95.5 | 95.5 | 95.5 | 95.5 |
| | Outside diameter | 100.0 | 100.0 | 100.0 | 100.0 | 100.0 | 100.0 |

TABLE 1-continued

| | | | Width b | | | (mm · mm²) |
|---|---|---|---|---|---|---|
| Armature groove | 0.5 | 0.8 | 1.0 | 1.2 | 1.5 | 2.2 |
| Area | 691.0 | 691.0 | 691.0 | 691.0 | 691.0 | 691.0 |
| Area ratio A4/A0 | 17.3% | 17.3% | 17.3% | 17.3% | 17.3% | 17.3% |
| Total area A0 | 4005.5 | 4005.5 | 4005.5 | 4005.5 | 4005.5 | 4005.5 |

Figure 9:
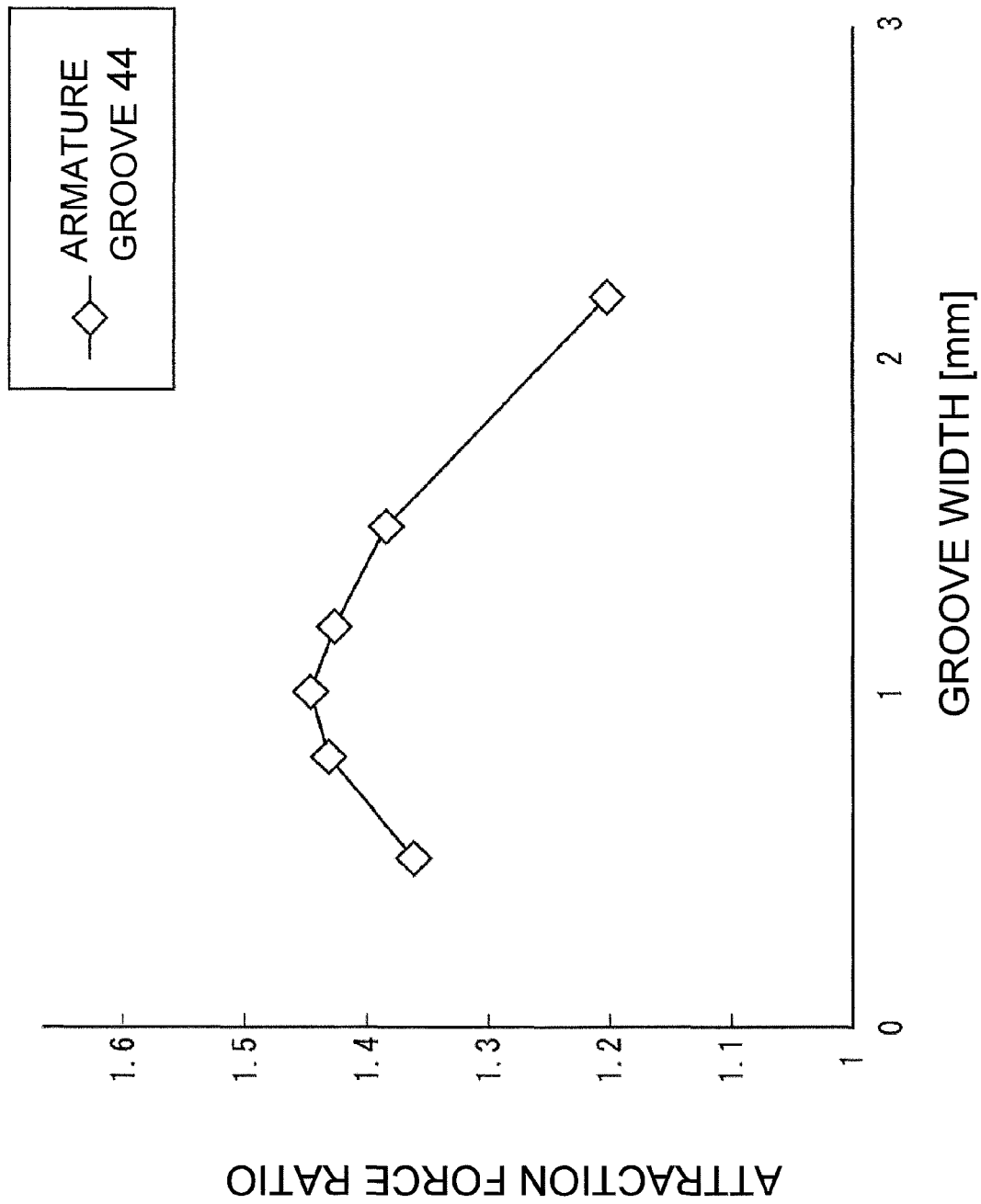
FIG. 9 is a graph showing the ratio of attraction force between an armature and a rotor at the time when the width of a groove formed between the armature and the rotor is changed.

The result is shown in FIG. 9.

As shown in FIG. 9, it was confirmed that the attraction force between the armature 42 and the rotor 43 was improved significantly by making the width b of the groove 44 narrower than the present-state width of 2.2. Also, it was confirmed that if the width b of the groove 44 was 0.5 mm, the attraction force between the armature 42 and the rotor 43 decreased slightly.

In the above-described embodiment, the configuration of the scroll compressor 10 has been explained. The configurations of other portions other than the configurations relating to the essential portion of the present invention are not limited at all. The same is true for the electromagnetic clutch M.

Besides, the configurations described in this embodiment can be selected, or can be changed as appropriate to any other configurations without departing from the spirit and scope of the present invention.

Figure 10A:
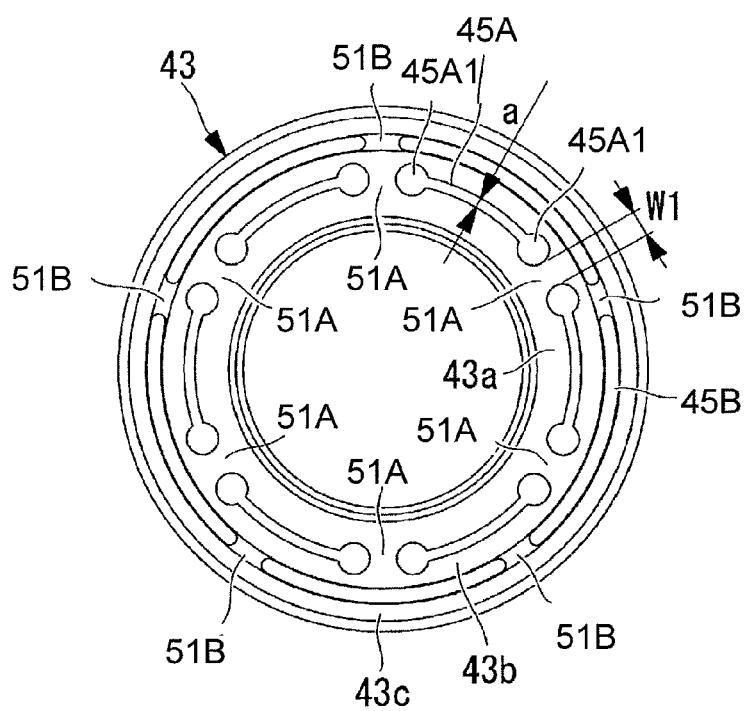
FIG. 10 is plan views showing an embodiment in which a circular end part is provided in a groove on the inner periphery side in a rotor, FIG. 10A being a plan view of the rotor, showing an armature contact surface, and FIG. 10B being an enlarged view of the groove end part shown in FIG. 10A.
Figure 10B:
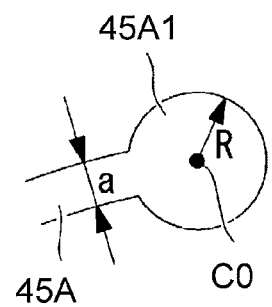

For the rotor 43, as shown in FIG. 10, the groove end portion of the groove 45A may be of a curved shape of an arc of a circle that is drawn by arranging the center position C0 on the centerline dividing the groove width a of the groove 45A into two parts and by taking the groove end radius (hereinafter, referred simply to as the "radius") as R. That is, a circular end part 45A1 formed by an arc formed by removing an arc portion that is in contact with the groove width a of the groove 45A from an arc of a circle the radius of which is R. This circular end part 45A1 is set so that the diameter 2R is larger than the groove width a (2R>a). Therefore, the circular end part 45A1 has curved portions swelling uniformly to the inner periphery side and the outer periphery side of the groove 45A.

For the rotor 43 of the above-described type of the electromagnetic clutch M, since the end portion of the groove 45A divided by the bridge 51A is formed as the curve-shaped circular end part 45A1 having the portions swelling to the outside from the groove width a, the bridge width W1 can be narrowed as compared with the conventional example while the strength of the bridge portion in which the bridge 51A is provided is maintained. That is, in the electromagnetic clutch M in which power is transmitted to the pulley 18 from the external driving source such as an engine via a V-belt or the like, the circular end part 45A1 distributes the stress of the bridge 51A with respect to the external force applied from the outer periphery side of the rotor 43. Therefore, even if the bridge width W1 is narrowed, the decrease in strength is prevented, so that the strength shortage can be solved.

As a result, if the particulars of the electromagnetic clutch M and the scroll compressor 10 are the same, even if the bridge width W1 is narrowed by adopting the circular end part 45A1, the portion of the bridge 51A can be prevented from being cracked (broken) due to the strength shortage.

Therefore, by the narrowing of the bridge width W1, the short-circuiting magnetic flux is reduced, and therefore the attraction force can be improved. In other words, for the electromagnetic clutch M in which the bridge width W1 is narrowed by adopting the circular end part 45A1, since the attraction force of the armature 42 can be increased while the strength of the bridge portion is maintained, the torque transmission capability is increased, and a trouble of slippage occurring between the armature 42 and the rotor 43 can be prevented or restrained.

Figure 11:
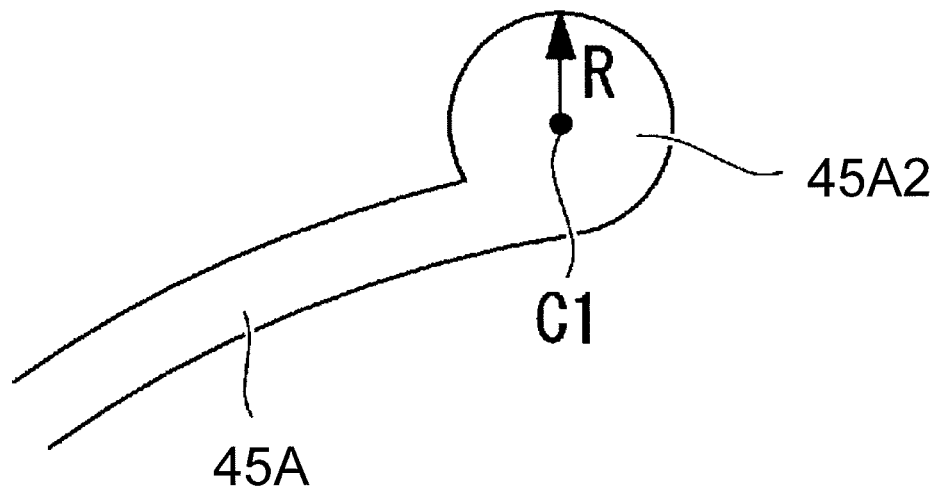
FIG. 11 is a plan view showing a first modification of the groove end part shown in FIG. 10.
Figure 12:
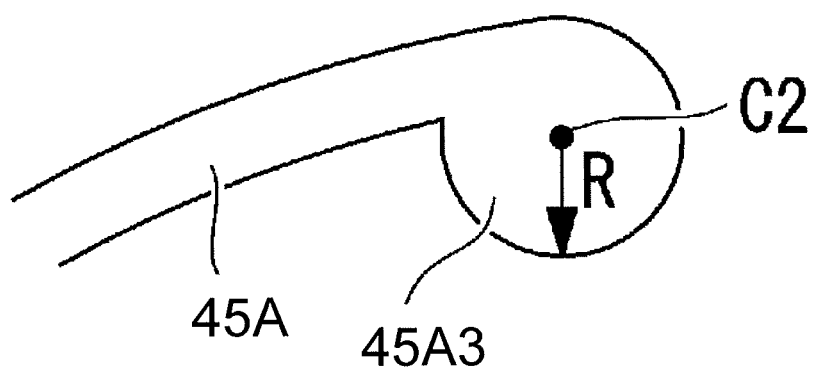
FIG. 12 is a plan view showing a second modification of the groove end part shown in FIG. 10.

For example, as shown in FIG. 11, the groove end portion of the groove 45A may be a circular end part 45A2 in which a circle center position C1 is shifted to the outer periphery side, or, for example, as shown in FIG. 12, it may be a circular end part 45A3 in which a circle center position C2 is shifted to the inner periphery side.

The curved shape formed in the end portion of the groove 45A is not limited to the above-described circular end parts 45A1, 45A2, and 45A3. For example, an elliptical shape having a swelling portion wider than the groove width a can also be adopted.

In this embodiment, the above-described circular end parts 45A1, 45A2, and 45A3 are applied to only the groove 45A on the inner periphery side. However, these circular end parts can also be applied to the groove 45B on the outer periphery side as necessary.

Reference Signs List

10 ... scroll compressor (compressor), 41 ... electromagnetic coil, 42 ... armature, 42a ... inner peripheral ring, 42b ... outer peripheral ring, 43 ... rotor, 43a ... inner peripheral ring, 43b ... central ring, 43c ... outer peripheral ring, 44 ... groove (intermediate groove), 45A ... groove (inner peripheral groove), 45B ... groove (outer peripheral groove), 46a ... rotor contact surface, 46b ... armature contact surface, 100 ... metal oxide layer, A1 ... first contact surface, A2 ... second contact surface, A3 ... third contact surface, A4 ... fourth contact surface, M ... electromagnetic clutch

The invention claimed is:

1. An electromagnetic clutch for transmitting power by attracting an armature to a contact surface of a rotor by means of a magnetic force of an electromagnetic coil and by combining the armature and the rotor together, wherein
    the armature contact surface of the rotor is divided in radial direction by a rotor-side groove;
    the rotor contact surface of the armature is divided in radial direction by an armature-side groove;
    a metal oxide layer is formed on at least one surface of a wall surface defining the rotor-side groove and a wall surface defining the armature-side groove; and
    the metal oxide layer has a thickness of 0.1 μm to 10 μm.

2. The electromagnetic clutch according to claim 1, wherein the metal oxide layer has a thickness of 0.5 μm to 3 μm.

3. A compressor provided with the electromagnetic clutch described in claim 2, the clutch being mounted in a shaft portion of a compression mechanism to transmit power.

4. The electromagnetic clutch according to claim 1, wherein the Vickers hardness of each of the rotor and the armature is in the range of 100HV10 to 350HV10, and the Vickers hardness of the metal oxide layer is in the range of 700HV0.003 to 1200HV0.003.

5. A compressor provided with the electromagnetic clutch described in claim 4, the clutch being mounted in a shaft portion of a compression mechanism to transmit power.

6. The electromagnetic clutch according to claim 1, wherein the width of the groove formed on the rotor contact surface of the armature is 0.8 to 1.2 mm.

7. A compressor provided with the electromagnetic clutch described in claim 6, the clutch being mounted in a shaft portion of a compression mechanism to transmit power.

8. A compressor provided with the electromagnetic clutch described in claim 1, the clutch being mounted in a shaft portion of a compression mechanism to transmit power.

9. A manufacturing method for an electromagnetic clutch which transmits power by attracting an armature to a contact surface of a rotor by means of a magnetic force of an electromagnetic coil and by combining the armature and the rotor together, in which an armature contact surface of the rotor is divided in radial direction by a rotor-side groove, and a rotor contact surface of the armature is divided in radial direction by an armature-side groove, the manufacturing method comprising the step of:

forming a metal oxide layer on at least one surface of a wall surface defining the rotor-side groove and a wall surface defining the armature-side groove by laser beam machining, wherein the metal oxide layer has a thickness of 0.1 μm to 10 μm.

10. The manufacturing method for an electromagnetic clutch according to claim 9, the manufacturing method further comprising the step of:

during the laser beam machining, blowing oxygen against a position at which a laser beam is applied.

\* \* \* \* \*